(12) United States Patent
Sampson et al.

(10) Patent No.: US 8,465,264 B2
(45) Date of Patent: Jun. 18, 2013

(54) JET PUMP APPARATUS

(75) Inventors: Bernard Francis Sampson, Bridgwater (GB); Robert John Harvey, Yeovil (GB)

(73) Assignee: Honeywell Nomalair-Garrett (Holdings), Somerset (GB)

( * ) Notice: Subject to any disclaimer, the term of this patent is extended or adjusted under 35 U.S.C. 154(b) by 1341 days.

(21) Appl. No.: 12/051,250

(22) Filed: Mar. 19, 2008

(65) Prior Publication Data

US 2008/0247881 A1 Oct. 9, 2008

(30) Foreign Application Priority Data

Mar. 21, 2007 (GB) .................................. 0705361.4

(51) Int. Cl.
| | |
|---|---|
| F04F 5/00 | (2006.01) |
| F04F 5/22 | (2006.01) |
| F04F 5/46 | (2006.01) |
| B64D 13/00 | (2006.01) |
| B64D 13/02 | (2006.01) |

(52) U.S. Cl.
USPC ............. 417/176; 417/168; 417/179; 261/76; 454/71; 454/76

(58) Field of Classification Search
USPC ... 417/158, 168, 176, 179; 261/76; 244/53 R, 244/53 B, 118.5; 454/71, 76
See application file for complete search history.

(56) References Cited

U.S. PATENT DOCUMENTS

| | | | | |
|---|---|---|---|---|
| 1,804,569 | A | * | 5/1931 | Taddiken ...................... 417/176 |
| 3,369,735 | A | * | 2/1968 | Hoffmeister .................. 417/174 |
| 3,441,045 | A | * | 4/1969 | Malone ......................... 137/114 |
| 3,552,883 | A | | 1/1971 | Weatherbee |
| 3,640,645 | A | | 2/1972 | Forsythe |
| 4,285,466 | A | * | 8/1981 | Linscheid et al. .............. 236/13 |
| 4,506,594 | A | * | 3/1985 | Rowland et al. ................ 454/74 |
| 4,842,777 | A | | 6/1989 | Lamort |
| 6,435,483 | B1 | | 8/2002 | Popov |
| 8,099,973 | B2 | * | 1/2012 | Sampson et al. ................ 62/401 |
| 2005/0064255 | A1 | | 3/2005 | Blaszczyk et al. |

FOREIGN PATENT DOCUMENTS

| | | |
|---|---|---|
| DE | 19845328 A1 | 6/1999 |
| GB | 2302523 | 1/1997 |
| JP | 2000049926 | 4/2001 |
| RU | 2056545 | 7/1992 |
| RU | 2056545 A | 3/1996 |

OTHER PUBLICATIONS

Search Report issued by UK IP Office for GB0705361.4, issued Jul. 5, 2007.
Search report issued by European Patent Office for EP08102737, completed May 9, 2008.

* cited by examiner

*Primary Examiner* — Peter J Bertheaud
(74) *Attorney, Agent, or Firm* — Lathrop & Gage LLP

(57) ABSTRACT

A jet pump apparatus for mixing a higher pressure gas and a lower pressure gas, includes an inlet section, an outlet section, a diffuser section and a mixing section. Inlet section includes a higher pressure inlet and a lower pressure inlet. Mixing section includes a plurality of separated mixing chambers. The diffuser section includes diffusers for receiving mixed gases from the mixing chambers. The outlet section receives mixed gases from the diffuser section and conveys those gases to an outlet. The inlet section includes a higher pressure inlet which receives higher pressure gas, and a lower pressure gas inlet which receives lower pressure gas. Each of the mixing chambers has a primary nozzle for introducing primarily higher pressure gas from to a respective mixing chamber, and a secondary inlet for introducing primarily lower pressure gas to each of the mixing chambers.

14 Claims, 4 Drawing Sheets

JET PUMP APPARATUS

CROSS-REFERENCE TO RELATED APPLICATIONS

This application claims priority to United Kingdom Patent Application No. GB0705361.4 filed Mar. 21, 2007, which is incorporated in its entirety by reference herein.

BACKGROUND OF THE INVENTION

This invention relates to a jet pump apparatus for mixing a higher pressure gas from a higher pressure gas supply derived from a compressor stage of a gas turbine engine, which typically is an aircraft engine, and a lower pressure gas from a lower pressure gas supply in order to provide a pressurised gas supply to a downstream apparatus, such as for example only, a downstream on-board oxygen generating system, e.g. of the kind which utilises molecular sieve bed technology, or an air conditioning apparatus, or any other desired gas-using downstream apparatus.

More particularly but not exclusively the invention is for mixing higher and lower pressure gases which are produced by respective higher and lower compression stages of a gas turbine engine.

DESCRIPTION OF THE PRIOR ART

Jet pumps are known for this purpose. These may alternatively be called injectors, airmovers, inducers, inspirators, vacuum pumps, ejectors, pressure exchangers, venturis, etc. These include a mixing chamber to which higher and lower pressure gas supplies are provided.

The purpose of using a jet pump in this context is to optimise the gas supply to be supplied to the downstream apparatus, for example as the pressure and/or temperatures the higher and lower gas pressure supplies may fluctuate.

It has been found that in a conventional jet pump design there is preferred relationship between the mixing chamber cross section and mixing chamber length for optimum mixing, this relationship commonly being expressed where the mixing chamber is of circular cross section, as a ratio between the mixing chamber length and diameter, which typically is about 8. Achieving this ratio whilst delivering a desired temperature of gas downstream thus places constraints on jet pump design. Particularly, in some applications there is insufficient space to accommodate a jet pump with a sufficiently long mixing chamber.

SUMMARY OF THE INVENTION

According to a first aspect of the invention we provide a jet pump apparatus for mixing a higher pressure gas from a higher pressure gas supply and a lower pressure gas from a lower pressure gas supply. The apparatus may include an inlet section, an outlet section, a diffuser section and a mixing section, the inlet section including a higher pressure gas inlet and a lower pressure gas inlet, the mixing section including a plurality of separated mixing chambers, and the diffuser section including diffusers for receiving mixed gases from each of the mixing chambers, and the outlet section receiving mixed gases from the diffuser section and conveying the mixed gases to a mixed gas outlet.

The inlet section may include a higher pressure gas inlet duct which receives higher pressure gas from the higher pressure gas inlet, and a lower pressure gas inlet duct which receives lower pressure gas from the lower pressure gas inlet.

For each of the plurality of mixing chambers, there may be a primary nozzle for introducing primary higher pressure gas from the higher pressure gas inlet duct to a respective mixing chamber. There may be a secondary inlet for introducing primarily lower pressure gas from the lower pressure inlet duct to each of the mixing chambers, the higher pressure gas being derived from a compressor section of a gas turbine engine.

The invention enables a jet pump apparatus to be provided with a plurality of parallel mixing chambers, each mixing chamber having the preferred mixing chamber length to mixing chamber cross section ratio, whilst overall the jet pump apparatus may be significantly shorter than a comparable conventionally constructed jet pump which has a single mixing chamber, whilst being able to provide the same gas supply to a downstream apparatus. This makes the jet pump apparatus of the invention particularly useful in contexts where there is restricted space, such as in an aircraft.

Each primary nozzle may have a larger cross section nozzle inlet to receive primarily higher pressure gas from the higher pressure gas inlet duct, and a smaller cross section outlet to deliver the gas to the respective mixing chamber.

In one example the primary nozzles each extend along axes which are parallel to a higher pressure gas flow direction as the higher pressure gas passes through the higher pressure gas inlet into the higher pressure gas inlet duct, and the secondary inlet introduces the lower pressure gas into the respective mixing chambers in a direction which is transverse to a lower pressure gas flow direction as the lower pressure gas passes through the lower pressure gas inlet and into the lower pressure gas inlet duct.

However if desired. the primary nozzles may each extend along axes which are transverse to a higher pressure gas flow direction as the higher pressure gas passes through the higher pressure gas inlet into the higher pressure gas inlet duct, and the secondary inlet introduces the lower pressure gas into the respective mixing chambers in a direction which is parallel to a lower pressure gas flow direction as the lower pressure gas passes through the lower pressure gas inlet and into the lower pressure gas inlet duct.

Each diffuser of the diffuser section may have a cross section which increases from an inlet towards the outlet section.

Where the mixing chambers are each of circular cross section, preferably these are closely nested e.g. with diffuser exterior walls in contact with as many as possible of the exterior walls of the other diffusers. It will be appreciated that there may therefore be an axially extending spacing provided by an actual void or solid body, between the nested mixing chambers which may continue between the diffusers of the diffuser section. The cross section of the inlet of the outlet section may substantially equal the combined cross sections of each of the diffusers at their largest cross section ends, plus the cross section of the axially extending spacing.

The jet pump apparatus of the invention may be used for supplying pressurised gas to a downstream apparatus of an aircraft. In one embodiment, the higher pressure gas inlet may thus be connected to a higher compression stage of a gas turbine engine, and the lower pressure gas inlet may be connected to a lower compression stage of a gas turbine engine.

According to a second aspect of the invention we provide a compressed gas supply system including a jet pump apparatus in accordance with the first aspect of the invention.

According to a third aspect of the invention we provide an aircraft which includes the compressed air supply system of the second aspect of the invention and a downstream apparatus which receives a pressurised gas supply from the compressed air supply system, the downstream apparatus including at least one of an on-board oxygen generating system and an air conditioning system.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
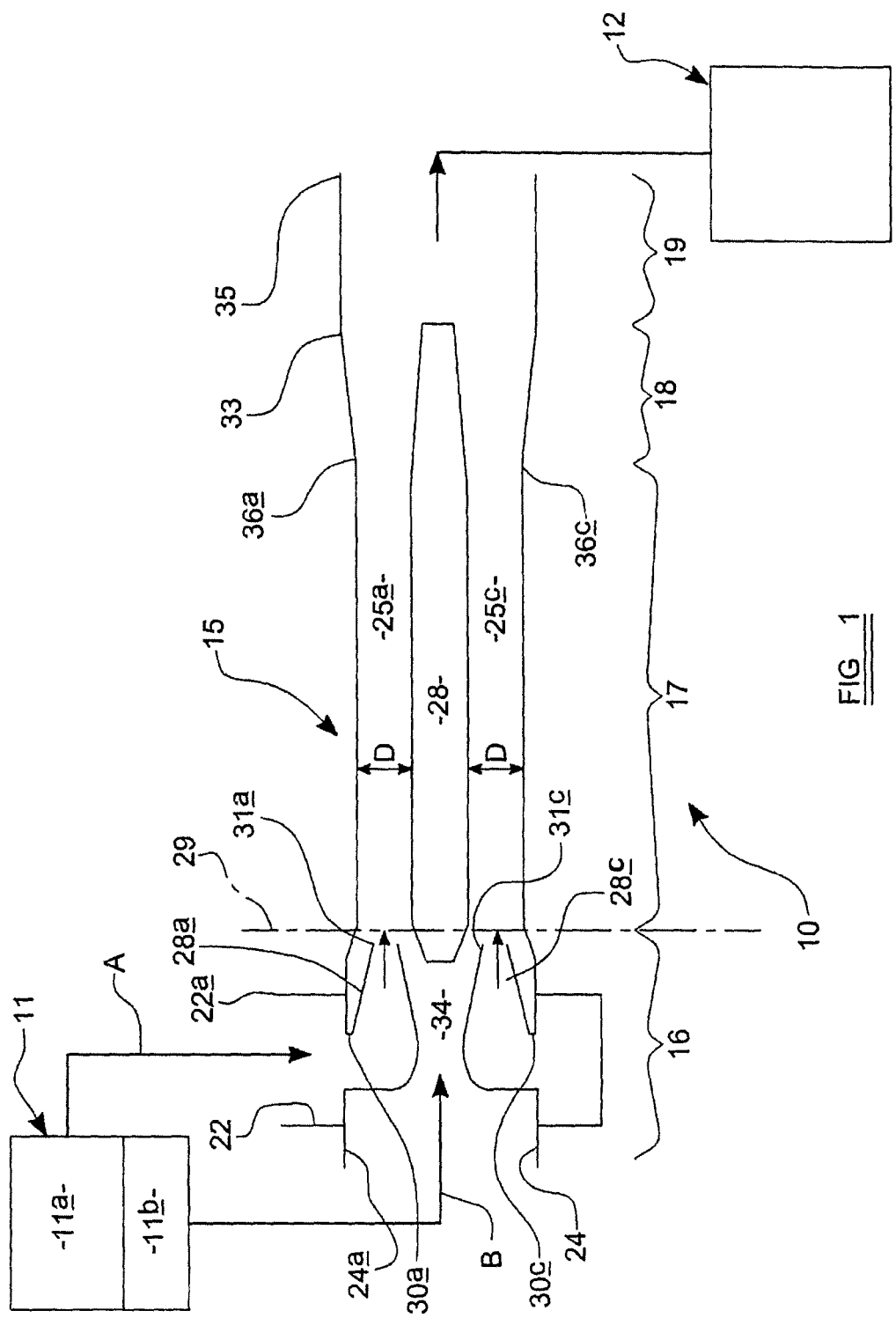
FIG. 1 is a diagrammatic side view of a compressed air supply system and jet pump apparatus, in accordance with the present invention.
Figure 1A:
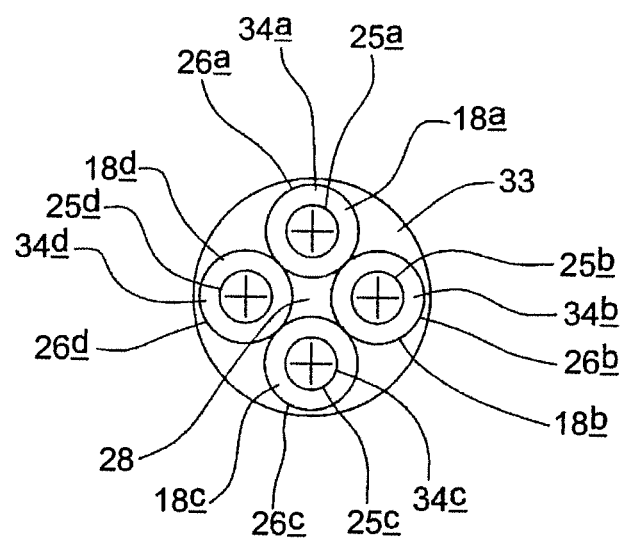
FIG. 1*a* is an end diagrammatic view of the jet pump apparatus of FIG. 1.
Figure 3:
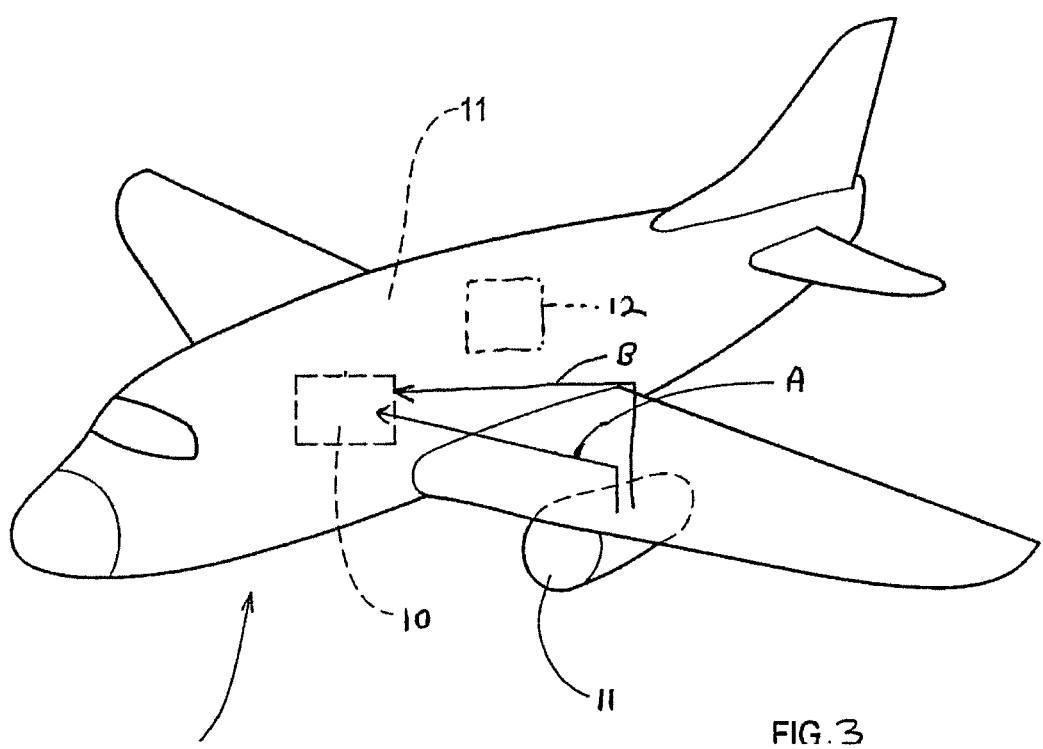
FIG. 3 is an illustrative view of an aircraft which may embody the invention.

Referring to FIGS. 1 and 1*a* and 3 of the drawings there is shown a compressed air supply system 10 of an aircraft 100, the system 10 receiving compressed bleed air from a gas turbine engine 11, and delivering pressurised gas to a downstream gas using apparatus 12 such as for examples only, an on-board oxygen or other product gas generating apparatus 12, which separates the pressurised gas into product gas and non-product gas, and/or an air conditioning apparatus of the aircraft 100.

The compressed air supply system 10 includes a jet pump apparatus 15 which has an inlet section 16, a mixing section 17, a diffuser section 18 and an outlet section 19.

The inlet section 16 includes a higher pressure air inlet 22*a* which is connected to a higher compression stage 11*a* of the gas turbine engine 11, and a lower pressure air inlet 24*a* which is connected to a lower compression stage 11*b* of the gas turbine engine 11.

The mixing section 17 is provided by a plurality of mixing chambers 25*a*-25*d*, four in this example, where the higher and lower pressure airs are mixed. The mixing chambers 25*a*-25*d* each receive both higher and lower pressure air from the inlet section 16, and each communicate with a respective diffuser 18*a*-18*d* of the diffuser section 18, which conveys the compressed air to the common outlet section 19 which is connected to the downstream gas using apparatus 12.

In this example, the mixing chambers 25*a*-25*d* are each cylindrical having a common and constant diameter D. The mixing chambers 25*a*-25*d* extend generally parallel to one another and there is an axially extending spacing 28 between the four mixing chambers 25*a*-25*d*, which may be a void as illustrated or a solid body.

Each mixing chamber 25*a*-25*d* extends from a mixing plane 29 where the inlet section 16 terminates, to the respective diffuser 18*a*-18*d* of the diffuser section 18. The diffusers 18*a*-18*d* are each generally circular in cross section and in this example, each has an inlet 36*a*-36*d* which has a diameter which affords it a cross section which is the same as the cross section of the respective mixing chamber 25*a*-25*d*. In this example the axially extending spacing 28 continues between the diffusers 18*a*-18*d*.

The diameters of the diffusers 18*a*-18*d* increase along the axial extents of the diffusers 18*a*-18*d* towards the outlet section 19.

Exterior diffuser walls 26*a*-26*d* at least at the larger diameter ends of the diffusers 18*a*-18*d* are in contact in this arrangement, so that the mixing chambers 25*a*-25*d* are as closely nested as possible.

The outlet section 19 is in this example cylindrical, and has an inlet 33 which receives the mixed air from each of the diffusers 18*a*-18*d*. The outlet section inlet 33 diameter is at least as great as the combined cross sections of the diffusers 18*a*-18*d* at their largest cross section ends, and this example, the outlet section inlet 33 cross section equals the combined cross sections of the largest diameter ends of the diffusers 18*a*-18*d* plus the cross section of the axially extending spacing 28.

The outlet section 19 is of generally constant diameter, which in this example is substantially the same as the diameter of the lower air pressure inlet 24*a* of the inlet section 16. The outlet section 19 includes a mixed air outlet 35 which is connected to the downstream gas using apparatus 12.

The inlet section 16 includes a higher pressure air inlet duct 22 which receives the higher pressure air from the higher pressure air inlet 22*a*, and a lower pressure air inlet duct 24 which receives the lower pressure air from the lower pressure air inlet 24*a*.

The inlet section 16 further includes a plurality of primary nozzles 28*a*-28*d*, four in this example, which each receive the higher pressure air from the higher pressure air inlet duct 22 and provide the higher pressure air to a respective mixing chamber 25*a*-25*d*. Each primary nozzle 28*a*-28*d* has a respective larger cross section nozzle inlet 30*a*-30*d* to receive the higher pressure air from the higher pressure air inlet duct 22, and a smaller cross section outlet 31*a*-31*d* to deliver the higher pressure air to its respective mixing chamber 25*a*-25*d*. The primary nozzles 28*a*-28*d* in this example extend generally parallel to one another along respective axes which lie transverse to a higher pressure air flow direction A as the higher pressure air passes through the higher pressure air inlet 22*a*, into the higher pressure air inlet duct 22 of the inlet section 16.

The smaller cross section downstream ends of the primary nozzles 28*a*-28*d* terminate just upstream of the mixing plane 29.

The inlet section 16 further includes a secondary inlet 34 which in this example is defined between the primary nozzles 28*a*-28*d*, the secondary inlet 34 receiving lower pressure air from the lower pressure air inlet duct 24. The secondary inlet 34 communicates with each of the mixing chambers 25*a*-25*d*. The secondary inlet 34 is generally in line with the lower air pressure inlet 24*a* to the inlet section 16. Thus the secondary inlet 34 introduces the lower pressure gas into the mixing chambers 25*a*-25*d* in a direction which is generally parallel to a lower pressure air flow direction B as the lower pressure air passes through the lower pressure air inlet 24*a* into the lower pressure air inlet duct 24.

It can be seen that the cross section of the lower air pressure inlet 24*a* is larger than the cross section of the higher pressure air inlet 22*a*. The inlet section 16 geometry shown and described results in the higher pressure air entering the respective mixing chambers 25*a*-25*d* through the primary nozzles 28*a*-28*d* whilst primarily the lower pressure air enters the mixing chambers 25*a*-25*d* through the secondary inlet 34.

As is well known to a person skilled in the art, the reducing cross sections of primary nozzles 28*a*-28*d* in the direction of air flow, creates a jet effect to draw the lower pressure air into the secondary inlet 34. The pressurised air from the engine 11 will be at high temperature. The lower pressure air from the lower compression stage 11*b* will be cooler than the more highly compressed air from the higher compression stage 11*a* of the engine 11.

To avoid or reduce the need to cool the mixed air in a downstream air cooler, desirably lower pressure air would primarily be used. However, although the lower pressure air is compressed, greater pressure air is desirable.

The jet pump apparatus 15 described allows high pressure air A to upgrade the pressure of the mixed air, compared with a solely lower pressure air supply B from compressor stage 11b of the engine 11. Thus less hot higher pressure air A is required, which also is a more economic and efficient arrangement than using solely hotter higher compression air A.

Also in the event of any reduction in the pressure of the available lower pressure air supply B, the higher pressure air supply A will maintain adequate pressure downstream of the apparatus 15.

Each mixing chamber 25a-25d preferably has a length to diameter ratio of substantially 8, which it is well known, results in the most efficient mixing of the different pressure gases.

The geometry of the jet pump apparatus 15 described provides functionally, four jet pumps, but with common inlet 16 and outlet 19 sections. The apparatus 15 is significantly shorter in overall length than would be an equivalent single mixing chamber jet pump for delivering the same mixed air supply to the downstream gas using apparatus 12, whilst the preferred relationship between the mixing chamber length to cross section, expressed in this example as the length to diameter ratio of 8, which would be required in a single mixing chamber arrangement, is preserved for each of the multiple mixing chambers 25a-25d of the jet pump apparatus 15 described.

Accordingly the jet pump apparatus 15 may be used in applications where there is insufficient space to accommodate a longer single mixing chamber jet pump, e.g. in an aircraft 100 context.

Figure 2:
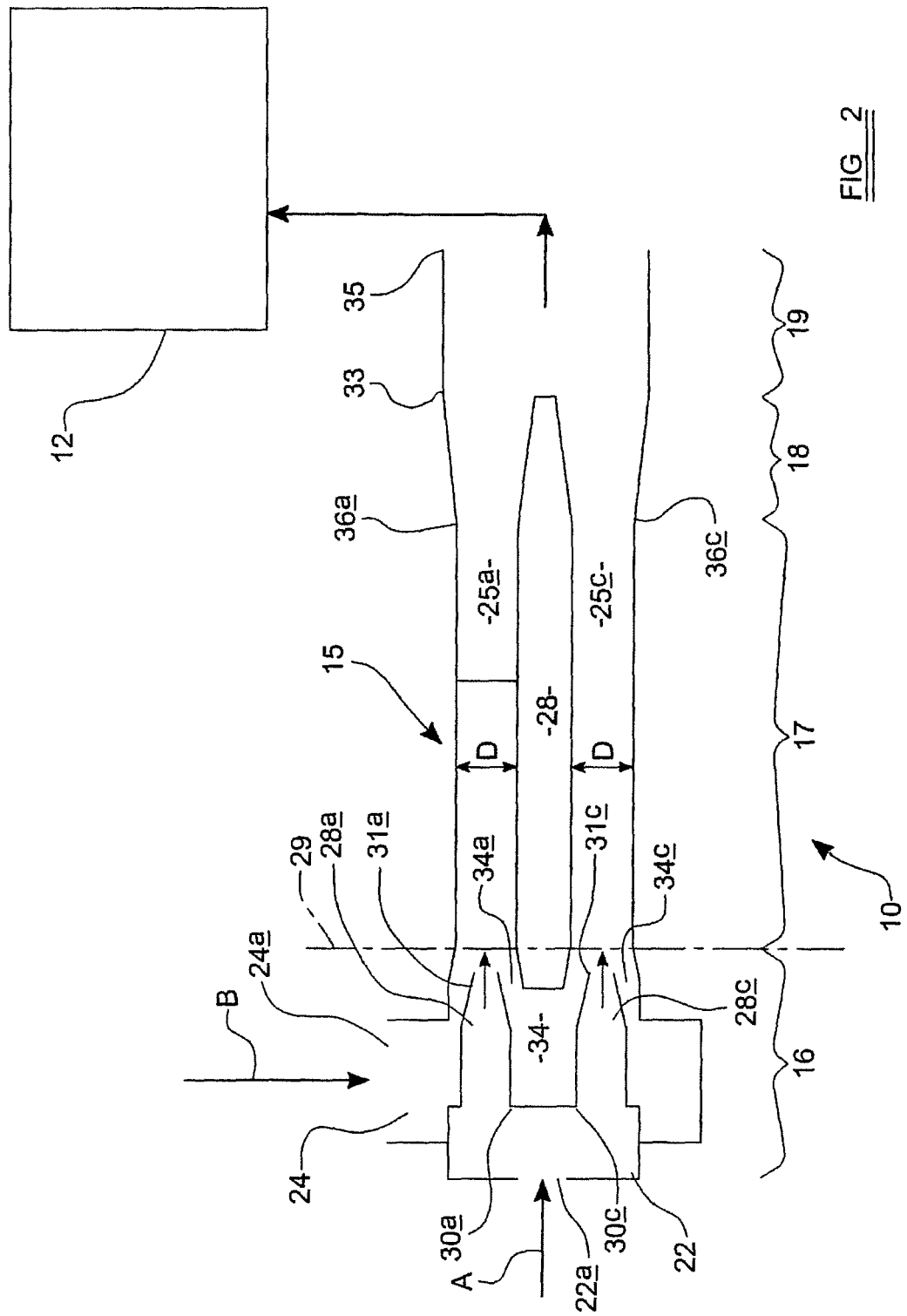
FIG. 2 is a view similar to FIG. 1 but of another embodiment.

Referring to FIG. 2, a compressed air supply system 10 is shown which is very similar to that of FIG. 1, but in this case the inlet section is modified. The same references are used in FIG. 2 for parts corresponding to those shown in FIG. 1. In FIG. 2, the engine 11 is not shown.

Whereas in the FIG. 1 embodiment, the higher pressure air A passes through the higher pressure air inlet 22a into the higher pressure air inlet duct 22 in a direction A transverse to the elongate axes of the primary nozzles 28a-28d, and the lower pressure air B passes through the lower pressure air inlet 24a into the lower pressure air inlet duct 24 a direction B parallel to the direction in which the lower pressure air is introduced through the secondary inlet 34 into the mixing chambers 25a-25d, in FIG. 2 an opposite arrangement is adopted.

In FIG. 2, the higher pressure air passes though the higher pressure air inlet 22a into the higher pressure air inlet duct 22 in a direction parallel to the elongate axes of the primary nozzles 28a-28d, and the lower pressure air B passes though the lower pressure air inlet 24a into the lower pressure air inlet duct 24 in a direction transverse to the direction in which the lower pressure air is introduced into the mixing chambers 25a-25d. In this embodiment, preferably the lower pressure air passes through the lower pressure air inlet 34, via inlet conduits 34a and 34c, tangentially of the primary nozzles 28a-28d.

Various modifications may be made without departing from the scope of the invention.

Although in this example, four mixing chambers 25a-25d are provided, in another example two, three or more than four mixing chambers 25a-25d may be provided to achieve a desired mixed air supply with a jet pump apparatus shorter than an equivalent single mixing chamber jet pump.

The mixing chambers 25a-25d need not be circular in cross section as described, although this is a preferred configuration, provided that the preferred mixing chamber length to cross section relationship is maintained. Similarly the outlet section 19 need not be circular in cross section, and the diffusers 18a-18d for each of the mixing chambers 25a-25d need not be frusto-conical as shown and described, although again, this is a preferred configuration.

The multiple mixing chambers 25a-25d and their diffusers 18a-18d need not be nested as illustrated, particularly where a different multiple number of mixing chambers 25a-25d are provided than the four in the example. Preferably the exterior wall 26a-26d of each diffuser 18a-18d will be in contact with or at least as close as is practical, to as many other exterior diffuser walls 26a-26d as is possible, so as to provide a smooth transition for the mixed air from the diffusers 18a-18d into the outlet section 19, and so that the outlet section 19 cross section can be the same as or at least similar to the cross section of the lower pressure air inlet 24.

As described, the primary nozzles 28a-28d and are all of frusto-conical configuration, which is preferred, but may be of other suitable configurations. The secondary inlet 34 may be provided otherwise than between the primary nozzles 28a-28d as in the example described.

In the examples, the higher pressure air from the higher compression stage 11a of the engine 11 enters the inlet section 16 in a direction A which is transverse to the direction in which the lower pressure air from the lower compression stage 11b of the engine 11 enters the inlet section 16, indicated at B. Preferably these airs enter the inlet section 16 in relatively transverse directions, but in another design, these may enter the inlet section 16 in the same or generally the same direction.

The jet pump apparatus 15 described may be readily fabricated or otherwise made, in metal or another suitable material.

The invention has been described with reference to an embodiment in which the higher and lower pressure gases to be mixed are air, but the apparatus 15 may be used to mix other gases as required, even dissimilar higher and lower pressure gases, depending on the requirements of the downstream apparatus 12 to be fed with the gas, which may be any gas using apparatus.

The lower pressure gas supply need not be derived from the gas turbine engine 11 at all, but could for example, be ambient air which may be pressurised as a result of the aircraft's 100 movement through the air.

The jet pump apparatus 15 in the example is described for use in an aircraft 100, but of course the apparatus 15 has multifarious other uses in vehicular, and static applications. In each case though, the higher pressure air supply is derived from the compressor section of a gas turbine engine.

The invention claimed is:

1. A jet pump apparatus for mixing a higher pressure gas from a higher pressure gas supply and a lower pressure gas from a lower pressure gas supply, the apparatus including an inlet section, an outlet section, a diffuser section and a mixing section, the inlet section including a higher pressure gas inlet and a lower pressure gas inlet, the mixing section including a plurality of separated mixing chambers, and the diffuser section including diffusers for receiving mixed gases from each of the mixing chambers, and the outlet section for receiving mixed gases from the diffuser section and conveying the mixed gases to a mixed gas outlet, and the inlet section including a higher pressure gas inlet duct which receives higher pressure gas from the higher pressure gas inlet, and a lower pressure gas inlet duct which receives lower pressure gas from the lower pressure gas inlet, and for each of the plurality of mixing chambers, there being a primary nozzle for introducing primarily higher pressure gas from the higher pressure gas inlet duct axially into a respective mixing chamber, and there being a secondary inlet for introducing primarily lower pressure gas from the lower pressure inlet duct axially into each of the mixing chambers, the higher pressure gas being derived from a compressor section of a gas turbine engine, wherein each of the diffusers of the diffuser section has a cross section which increases towards the outlet section; wherein the mixing chambers are each of circular cross section, and the mixing chambers are closely nested so that there is an axially extending spacing between the nested mixing chambers; and wherein exterior walls of adjacent diffusers at least at the larger diameter end of the diffuser are in contact.

2. An apparatus according to claim 1 wherein the plurality of mixing chambers are arranged generally parallel to each other.

3. An apparatus according to claim 1 wherein the mixing chambers are generally cylindrical, each mixing chamber having a mixing chamber length to mixing chamber diameter ratio of about 8.

4. An apparatus according to claim 1 wherein each primary nozzle has a larger cross section nozzle inlet to receive primarily higher pressure gas from the higher pressure gas inlet duct, and a smaller cross section outlet to deliver the gas to the respective mixing chamber.

5. An apparatus according to claim 1 wherein the primary nozzles each extend along axes which are parallel to a higher pressure gas flow direction as the higher pressure gas passes through the higher pressure gas inlet into the higher pressure gas inlet duct, and the secondary inlet introduces the lower pressure gas into the respective mixing chambers in a direction which is transverse to a lower pressure gas flow direction as the lower pressure gas passes through the lower pressure gas inlet into the lower pressure gas inlet duct.

6. An apparatus according to claim 1 wherein the primary nozzles each extend along axes which are transverse to a higher pressure gas flow direction as the higher pressure gas passes through the higher pressure gas inlet into the higher pressure gas inlet duct, and the secondary inlet introduces the lower pressure gas into the respective mixing chambers in a direction which is parallel to a lower pressure gas flow direction as the lower pressure gas passes through the lower pressure gas inlet into the lower pressure gas inlet duct.

7. An apparatus according to claim 1 wherein the cross section of an inlet of the outlet section substantially equals the combined cross sections of each of the diffusers at their largest cross section ends, plus the cross section of the axially extending spacing.

8. An apparatus according to claim 1 wherein the higher pressure gas inlet is connected to a higher compression stage of the gas turbine engine, and the lower pressure gas inlet is connected to a lower compression stage of the gas turbine engine.

9. A compressed gas supply system including a jet pump apparatus of claim 1 for mixing a higher pressure gas from a higher pressure gas supply and a lower pressure gas from a lower pressure gas supply.

10. A compressed gas supply system according to claim 9 wherein, in the jet pump apparatus, the primary nozzles each extend along axes which are parallel to a higher pressure gas flow direction as the higher pressure gas passes through the higher pressure gas inlet into the higher pressure gas inlet duct, and the secondary inlet introduces the lower pressure gas into the respective mixing chambers in a direction which is transverse to a lower pressure gas flow direction as the lower pressure gas passes through the lower pressure gas inlet into the lower pressure gas inlet duct.

11. A compressed gas supply system according to claim 9 wherein, in the jet pump apparatus, the primary nozzles each extend along axes which are transverse to a higher pressure gas flow direction as the higher pressure gas passes through the higher pressure gas inlet into the higher pressure gas inlet duct, and the secondary inlet introduces the lower pressure gas into the respective mixing chambers in a direction which is parallel to a lower pressure gas flow direction as the lower pressure gas passes through the lower pressure gas inlet into the lower pressure gas inlet duct.

12. An aircraft which includes a compressed air supply system including a jet pump apparatus of claim 1 for mixing a higher pressure gas from a higher pressure gas supply and a lower pressure gas from a lower pressure gas supply.

13. An aircraft according to claim 12 wherein, in the jet pump apparatus, the primary nozzles each extend along axes which are parallel to a higher pressure gas flow direction as the higher pressure gas passes through the higher pressure gas inlet into the higher pressure gas inlet duct, and the secondary inlet introduces the lower pressure gas into the respective mixing chambers in a direction which is transverse to a lower pressure gas flow direction as the lower pressure gas passes through the lower pressure gas inlet into the lower pressure gas inlet duct.

14. An aircraft according to claim 12 wherein, in the jet pump apparatus, the primary nozzles each extend along axes which are transverse to a higher pressure gas flow direction as the higher pressure gas passes through the higher pressure gas inlet into the higher pressure gas inlet duct, and the secondary inlet introduces the lower pressure gas into the respective mixing chambers in a direction which is parallel to a lower pressure gas flow direction as the lower pressure gas passes through the lower pressure gas inlet into the lower pressure gas inlet duct.

* * * * *